Figure 1:
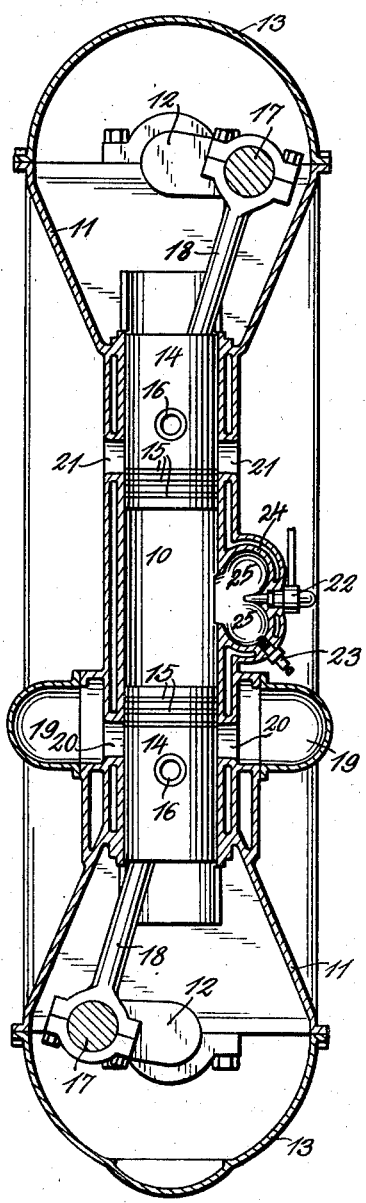

May 31, 1938.  J. P. RUTH  2,119,219
COMPRESSION IGNITION INTERNAL COMBUSTION ENGINE
Filed Sept. 13, 1935 2 Sheets-Sheet 1

Inventor
Joseph P. Ruth.

By

Attorney

May 31, 1938.  J. P. RUTH  2,119,219
COMPRESSION IGNITION INTERNAL COMBUSTION ENGINE
Filed Sept. 13, 1935   2 Sheets-Sheet 2

Inventor
Joseph P. Ruth.

By

Attorney

Patented May 31, 1938

2,119,219

UNITED STATES PATENT OFFICE 2,119,219

COMPRESSION IGNITION INTERNAL COMBUSTION ENGINE

Joseph P. Ruth, Denver, Colo.

Application September 13, 1935, Serial No. 40,418

6 Claims. (Cl. 123—32)

This invention relates to internal combustion engines, particularly to internal combustion engines of compression ignition type commonly known as Diesel engines, and more specifically to that type of Diesel engine wherein liquid hydrocarbon fuel is injected directly into the engine combustion chamber, and has as an object to provide an improved construction and arrangement of combustion chamber in operative combination with an engine of the type set forth.

A further object of the invention is to provide an improved construction and arrangement of combustion chamber particularly adapted for efficient cooperation with that style of Diesel-type internal combustion engine wherein a pair of aligned pistons are arranged for simultaneous, opposed travel in a common cylinder bore.

A further object of the invention is to provide an improved construction and arrangement of combustion chamber particularly adapted to enhance the efficiency of 2-stroke cycle Diesel-type engines.

A further object of the invention is to provide an improved construction and arrangement of combustion chamber which may be employed to advantage in the construction and operation of relatively high speed Diesel-type engines.

A further object of the invention is to provide an improved construction and arrangement of combustion chamber particularly adapted for efficient cooperation with 2-stroke cycle Diesel-type engines wherein both elements obstructing the otherwise open ends of the cylinder are simultaneously and oppositely movable.

A further object of the invention is to provide an improved construction and arrangement of combustion chamber in a Diesel-type engine whereby improved admixture of air with liquid hydrocarbon fuel injected directly into said combustion chamber may be had.

A further object of the invention is to provide an improved construction and arrangement of combustion chamber in a Diesel-type engine whereby atomizing and admixing turbulence may be progressively increased to enhance the combustibility of a liquid fuel and air mixture as the compression factor of said mixture approaches the ignition point.

A further object of the invention is to provide an improved construction and arrangement of combustion chamber in a Diesel-type engine whereby an ignited fuel charge in said chamber may be more efficiently applied to accomplish useful work.

A further object of the invention is to provide an improved construction and arrangement of combustion chamber in a Diesel-type engine whereby the pressures developed by a relatively slow burning fuel charge within said chamber may be more efficiently applied and proportioned to movable piston elements of said engine wherethrough useful work is accomplished.

A further object of the invention is to provide an improved construction and arrangement of piston, cylinder and combustion chamber elements in a Diesel-type engine wherethrough enhanced engine efficiency and relatively higher speed of engine operation may be had.

A further object of the invention is to provide an improved construction and arrangement of piston, cylinder and combustion chamber elements in a Diesel-type engine cooperable to attain high admixing efficiency of air with a liquid fuel charge, productive of a high compression factor, arranged to proportion and efficiently transmit combustion pressures deriving from a slow-burning fuel to the working elements of an engine assembly, and particularly susceptible of efficient practical embodiment to give effect to the requirements and principles of 2-stroke cycle engine assemblies.

My invention consists in the construction, arrangement and combination of elements hereinafter set forth, pointed out in my claims and illustrated by the accompanying drawings, in which—

Figure 2:
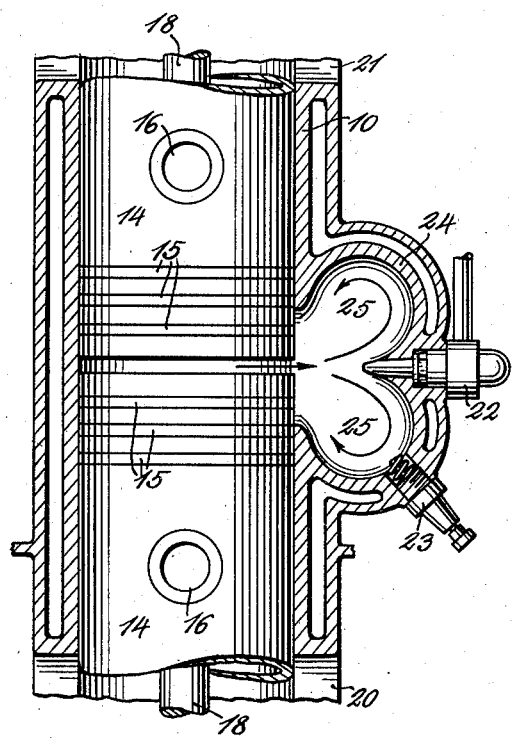
Figure 3:
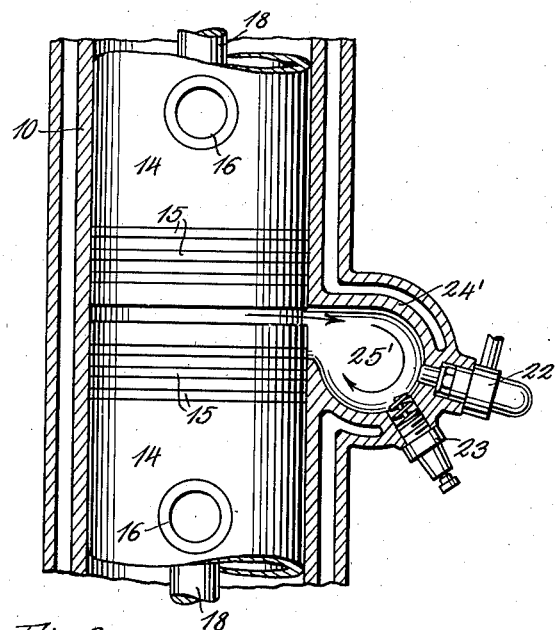
Figure 4:
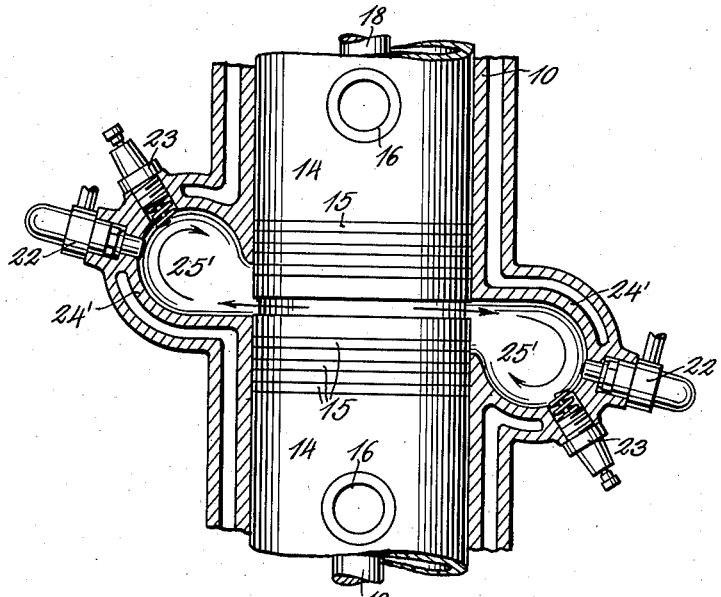

Figure 1 is a section axially of a conventionalized 2-stroke cycle, Diesel-type internal combustion engine embodying the principles of the instant invention, only those elements of the engine assembly essential to an understanding of the invention being illustrated. Figure 2 is a fragmentary detail section, on an enlarged scale, of the combustion chamber and associated elements shown in Figure 1, the reciprocable pistons of the assembly being illustrated at one limit of their range of travel. Figure 3 is a fragmentary detail section similar to the showing of Figure 2 and illustrating a somewhat modified form of the invention. Figure 4 is a fragmentary detail section similar to Figure 2 and illustrating a still further modified form of the invention.

In the construction of the improvement as shown, a 2-stroke cycle compression ignition internal combustion engine is conventionally represented as comprising a relatively long, straight, open-ended cylinder 10 of uniform bore. Each end of the cylinder 10 suitable communicates with and is supported by a crankcase half 11 wherein a crankshaft 12 is suitably journaled for rotation about an axis perpendicular to that of the cylinder 10, a crankshaft 12 being thus operatively disposed adjacent each end of said cylinder. The crankshaft assemblies of the engine are completed by means of cover elements 13 which removably cooperate with the crankcase halves 11 to form housings enclosing the crankshafts 12, as is common practice. A pair of identical pistons 14, each provided with suitable sealing rings 15, is fitted within and disposed for reciprocation axially of the cylinder 10, said pistons 14 being oppositely disposed within said cylinder and arranged with their closed ends opposed inwardly of said cylinder. Suitable conventional wrist-pins 16 are provided in the pistons 14 in spaced, parallel alignment with crank-pins 17 formed on the crankshafts 12, and a suitable rigid connecting rod 18 operatively connects the wrist-pin 16 of each piston 14 with the crank-pin 17 of the adjacent crankshaft 12, the lengths of the piston, connecting rod and crank-throw being such as to position the adjacent closed ends of the two pistons 14 in closely spaced justaposition with only mechanical clearance therebetween when the crank-pins 17 are aligned with the cylinder axis at that point on their orbits most nearly adjacent the corresponding end of said cylinder. The crankshafts 12 are interconnected by any suitable means, not shown, for simultaneous, synchronized rotation in opposite directions, and are so "timed' as to link the pistons 14 for simultaneous, opposite reciprocation in the cylinder 10 in such manner as to bring said pistons simultaneously to corresponding limits of their range of reciprocation within said cylinder 10. The engine shown being of 2-stroke compression ignition or Diesel-type in which the fuel charge is delivered in liquid form directly to the combustion chamber of the engine, means need be provided for the introduction of air in suitable quantities for admixture with the liquid fuel charge within the cylinder, such means being indicated as comprising suitable air conduits 19 communicating between the pressure side of a suitable blower or supercharger elements, not shown, operatively associated in driven relation with the engine and the interior of the cylinder 10 through ports 20 opening through the wall of said cylinder in position to be uncovered by one of the pistons 14 as the latter reaches the outer limit of its range of reciprocation relative to said cylinder, which piston position corresponds with the "bottom dead center" of a conventional internal combustion engine. To provide means for the exhaust of burned gases from the cylinder 10, ports 21 are formed through the cylinder wall in spaced relation with the ports 20 and in position to be uncovered by the piston 14 not associated with the ports 20 as said piston reaches the "bottom dead center" of its stroke. By virtue of the crankshaft interconnection and "timing", the pistons 14 reach their outer limits of reciprocation or "bottom dead center" positions simultaneously, at which time the ports 20 and 21 are uncovered by their respective pistons and a free passage way is open from the pressure side of the blower or supercharger through the conduits 19, ports 20, cylinder 10 and ports 21, through which air under pressure from the blower or supercharger may be delivered to the cylinder 10 between the pistons 14, which incoming air drives the burned gases within the cylinder 10 before it and outwardly of said cylinder through the ports 21, the size and position of the ports 20 and 21 being so determined as to permit thorough scavenging of the burned gases from the cylinder and a full charge of fresh air within said cylinder when said ports are covered by their respective pistons by simultaneous inward travel of the latter. In conventional engines of the character illustrated, a liquid fuel charge is injected directly into the cylinder bore between the pistons 14 as the latter move toward each other through a suitable fuel supply system terminating in a conventional injector of the type shown at 22, the said fuel charge and air admixing within the cylinder 10 between the approaching pistons 14 until the increasing compression produced by said pistons reaches the fuel-igniting point, whereupon the fuel charge is burned to generate pressures effective to separate said pistons and thereby complete the operative cycle, the compression ignition point of the fuel charge naturally being attained just prior to "top dead center" position of the pistons 14. To initiate operation of the engine, a suitable glow tube or igniting device, of that type conventionally illustrated at 23, is provided in operative communication with the combustion chamber of the engine. All of the foregoing is standard and substantially conventional construction and practice, and is illustrated and described solely to define a locus for the invention hereinafter set forth and to typify an engine construction and operation to which said invention is efficiently and primarily adaptable.

In the operation of engines of the type shown and described, it is necessary that admixture of the liquid fuel and air comprising the combustible charge be accomplished during the compression stroke of the pistons, and such admixture may be adequately accomplished in the cylindrical space defined by the cylinder wall and approaching piston ends with relatively slow speeds of the engine, but the turbulence essential to an efficient atomization and admixture of the fuel charge has a marked tendency to decrease as the compression factor increases with a consequently resultant imperfectly mixed, slow-burning fuel charge at the instant of ignition. Further, for efficient high-speed engine operation it becomes desirable that the pressures developed by the burning fuel charge be a maximum at the beginning of the power stroke and be progressively applied to the moving pistons without decrease proportional to the volumetrical increase in the chamber defined between said pistons, since in engines of the type shown and described the opposite travel of the piston ends results in a very rapid increase in the volume of the chamber therebetween and reduces the force and efficiency of the impelling pressure supplied through combustion only of the fuel charge within said chamber, said combustion alone being adequate to maintain an operative pressure on the piston ends when the engine is operated at relatively slow speeds. To overcome the foregoing disadvantages of conventional construction and to adapt such construction to efficient, high-speed operation the instant invention contemplates the provision of an auxiliary combustion chamber arranged and designed to facilitate and improve admixture of the fuel charge and to more efficiently apply the pressures of combustion, as hereinafter described.

As shown in Figures 1 and 2, a suitable offset or boss 24 is formed in and radially of the wall of the cylinder 10 at the "top dead center" position of the pistons 14, said boss 24 having a longitudinal extension in excess of its circumferential extension relative to the cylinder 10 and serving to define and enclose a 2-lobed chamber communicating with the bore of the cylinder 10 between the ends of the pistons 14. Each lobe of the chamber within the boss 24 is substantially a completely spherical recess, as indicated at 25, and the two said recesses 25 comprising the combustion chamber are disposed with their centers on a line parallel with and spaced from the axis of the cylinder 10, and said centers are spaced apart a distance substantially equal to the diameter of a recess 25 and disposed so that adjacent walls of said recesses merge tangentially in a plane perpendicular to the cylinder axis and lying equidistant from the ends of the pistons 14. The relatively remote spherical surfaces of the recesses 25 merge smoothly with margins of a port communicating with the interior of the cylinder 10, which port is centered on a cylinder radius perpendicular to the line containing the centers of the recesses 25 and bisecting the distance between said centers, said port having an effective opening considerably less than the combined cross-sectional areas of the recesses 25. When the auxiliary combustion chamber is provided as shown and described, the fuel injector element 22 is positioned for discharge of liquid fuel through the recesses 25 and the communicating port into the cylinder 10 and hence is preferably disposed in the wall of the boss 24 intermediate said recesses 25 with its jet opening aligned for discharge along that cylinder radius whereon the communicating port of said recesses is centered, the igniter element 23 being positioned through a wall of the boss 24 in operative relation with the interior of a recess 25 as may be most convenient or expedient.

In the practical operation of the auxiliary combustion chamber illustrated and above described, the injector element 22 is operatively connected with and "timed" relative to movable elements of the engine assembly so as to deliver a charge of liquid fuel through the auxiliary combustion chamber and communicating port thereof to the bore of the cylinder 10 between the ends of the pistons 14 as said pistons approach each other in closing relation with their respective ports 20 and 21, the cylinder chamber between said piston ends then containing a charge of unvitiated air delivered through the conduits 19 and ports 20. As said pistons 14 move inwardly toward each other, a certain amount of disturbance in the form of currents and eddies is created and maintained in the mixture of air and fuel confined between said pistons, and the auxiliary combustion chamber functions during this period to stimulate and enhance such disturbance to the end of more perfect admixture of air and liquid fuel particles. As will be immediately apparent, turbulence within the combustible mixture between the pistons 14 is promoted and sustained as said pistons move inwardly through the specific form and position of the auxiliary chamber, since portions of the gaseous mixture escaping through the communicating port from the cylinder 10 to the recesses 25 of the auxiliary chamber are forced to follow the spherical inner walls of said recesses 25 and are thereby returned to intersecting and eddying relation with other or succeeding portions and currents of said mixture and to escape from the auxiliary chamber through its communicating port in a state and condition of violently turbulent agitation. As the pistons 14 approach, the pressure on the gaseous mixture therebetween is increased with consequent constant diversion of a portion of said mixture from the cylinder 10 to the auxiliary chamber within which latter the mixture is unable, because of the conformation of the chamber walls, to acquire anything approaching a quiescent status and is consequently forced to an incessant violent turbulence. The degree of mixture turbulence produced by the auxiliary chamber will of course vary and increase as the pistons 14 reduce the volume of the cylinder chamber, but a further factor operative to rapidly increase the degree of mixture turbulence just prior to and at the time of compression ignition thereof is found in the relative position and arrangement of the auxiliary chamber. The communicating port of the auxiliary chamber being centered midway of the ends of the pistons 14, it is at once apparent that said pistons in their inward strokes simultaneously reach opposite margins of said communicating port and simultaneously act to reduce the effective area thereof, the result being a restriction in the opening through which the gaseous mixture may pass to the auxiliary chamber and a consequent enhanced velocity of said mixture outwardly of the cylinder chamber and inwardly of the auxiliary chamber with a resultant enhanced turbulence and agitation of said mixture at and just prior to its point of maximum compression where ignition of the charge is had. With the use of relatively heavy liquid fuels, and particularly when such fuels are injected in liquid form directly to a combustion chamber, very intimate and thorough admixture of fuel and air is essential to the production of a uniform, quick-burning, combustible mixture such as is fundamental to high-speed engine operation, and the auxiliary chamber arrangement shown and described is highly efficient in the development and maintenance of such a mixture. When the fuel mixture is ignited and begins to burn, the pistons 14 are in closely spaced juxtaposition and in their maximum obstructing relation with the communicating port of the auxiliary chamber, thus confining the burning fuel charge to a minimum volume wherein the initial pressures from combustion are rapidly built up and augmented for power application between and for separation of the piston elements, the restricted area of the port communicating with the auxiliary chamber limits escape of the burning charge from the auxiliary chamber and maintains a high operative pressure acting to separate the piston elements until combustion of the fuel charge is substantially complete, whereafter the piston elements will be separated sufficiently to completely uncover the communicating port of the auxiliary chamber and permit rapid expansion of the hot gases from said chamber through said port to efficient operative effect in further separation of the piston elements, thus maintaining efficient combustion pressures between the piston elements until maximum separation of the latter has uncovered the ports 20 and 21 for exhaust of the burned gases and scavenging of the cylinder chamber.

In the modification according to Figure 3, the operative principle of the invention therein disclosed is in all essential respects identical with that hereabove described, the modification being one of structure only and comprising replacement of the boss 24 with a similarly located boss 24' of lesser size and enclosing a single lobed auxiliary chamber in the form of a spherical recess 25', the injector 22 and igniter 23 being operatively associated with the recess 25' in a manner similar to that previously recited. When a single-lobed auxiliary chamber is employed, it becomes obvious that the spherical recess of such chamber should bear the same relation to the piston elements as does one of the recesses 25 of the double-lobed chamber, so that one wall of the recess 25' may be tangentially continued to merge with a margin of its communicating port for substantial alignment with one end of a piston 14 when the latter is in its "top dead center" position, thereby promoting a circulation of the gaseous mixture relative to and within the recess 25' which is productive of the maximum turbulence.

The modification according to Figure 4 is but an elaboration and extension of that shown in Figure 3, the boss 24' and single recess 25' of Figure 3 being duplicated in inverted relation on opposite sides of the cylinder 10 in said latter figure, the tangential walls of the duplicate recesses 25' being arranged for alignment with opposite piston ends when the latter have reached the limit of their relative approach. While duplicate injectors 22 and igniters 23 are disclosed in operative association with the duplicate recesses 25' of Figure 4, it should be apparent that but one set of such auxiliary elements is necessary to efficient and satisfactory operation of the disclosed assembly.

Since many changes in the specific form, construction and arrangement of the elements shown and described may be had without departing from the spirit of the invention, and may in fact be necessary in adapting the principles of the invention to specific engine embodiments, I wish to be understood as being limited solely by the scope of the appended claims, rather than by any details of the illustrative showing and foregoing description.

I claim as my invention:

1. In a compression ignition internal combustion engine, a cylinder, a bore axially of said cylinder, a pair of pistons operatively associated with said cylinder for simultaneous, oppositely-directed reciprocation axially thereof, an arcuate-walled auxiliary combustion chamber comprising a pair of spherical lobes tangentially disposed with their centers on a line parallel with the cylinder axis carried by and in radially offset relation with said cylinder intermediate said pistons, a port communicating between said cylinder bore and auxiliary chamber, and means operable to inject liquid fuel into said cylinder bore and auxiliary chamber.

2. In a compression ignition internal combustion engine, a cylinder, a bore axially of said cylinder, a pair of pistons operatively associated with said cylinder for simultaneous, oppositely-directed reciprocation axially thereof, an arcuate-walled auxiliary combustion chamber comprising a pair of spherical lobes tangentially disposed with their centers on a line parallel with the cylinder axis carried by and in radially offset relation with said cylinder intermediate said pistons, a port centered on a radius of said cylinder bisecting the distance between said pistons and communicating between said cylinder bore and auxiliary chamber, and means operable to inject liquid fuel into said cylinder bore and auxiliary chamber.

3. In a compression ignition internal combustion engine, a cylinder, a bore axially of said cylinder, a pair of pistons operatively associated with said cylinder for simultaneous, oppositely-directed reciprocation axially thereof, an auxiliary combustion chamber comprising a pair of spherical lobes tangent to a common cylinder radius bisecting the distance between said pistons and disposed with their centers on a line perpendicular to said radius, a port centered on said radius and communicating between said cylinder bore and auxiliary chamber, and means operable to inject liquid fuel into said cylinder bore and auxiliary chamber.

4. In a compression ignition internal combustion engine, having a cylinder formed with an axial bore and a pair of pistons associated with said cylinder for simultaneous, oppositely-directed reciprocation axially thereof, an arcuate-walled auxiliary combustion chamber comprising a pair of spherical lobes tangentially disposed with their centers on a line parallel with the cylinder axis carried by and in radially offset relation with said cylinder intermediate said pistons, a port communicating between said cylinder bore and auxiliary chamber, and means operable to inject liquid fuel into said cylinder bore and auxiliary chamber.

5. In a compression ignition internal combustion engine having a cylinder formed with an axial bore and a pair of pistons associated with said cylinder for simultaneous, oppositely-directed reciprocation axially thereof, an arcuate-walled auxiliary combustion chamber comprising a pair of spherical lobes tangentially disposed with their centers on a line parallel with a cylinder axis carried by and in radially offset relation with said cylinder intermediate said pistons, a port centered on a radius of said cylinder bisecting the distance between said pistons and communicating between said cylinder bore and auxiliary chamber, and means operable to inject liquid fuel into said cylinder bore and auxiliary chamber.

6. In a compression ignition internal combustion engine having a cylinder formed with an axial bore and a pair of pistons associated with said cylinder for simultaneous, oppositely-directed reciprocation axially thereof, an auxiliary combustion chamber comprising a pair of spherical lobes tangent to a common cylinder radius bisecting the distance between said pistons and disposed with their centers on a line perpendicular to said radius, a port centered on said radius and communicating between said cylinder bore and auxiliary chamber, and means operable to inject liquid fuel into said cylinder bore and auxiliary chamber.

JOSEPH P. RUTH.